Nov. 18, 1930.                O. P. ERICKSON                 1,782,062
                      UNIVERSAL JOINT FOR PIPE COUPLINGS
                        Filed April 5, 1928       2 Sheets-Sheet 2

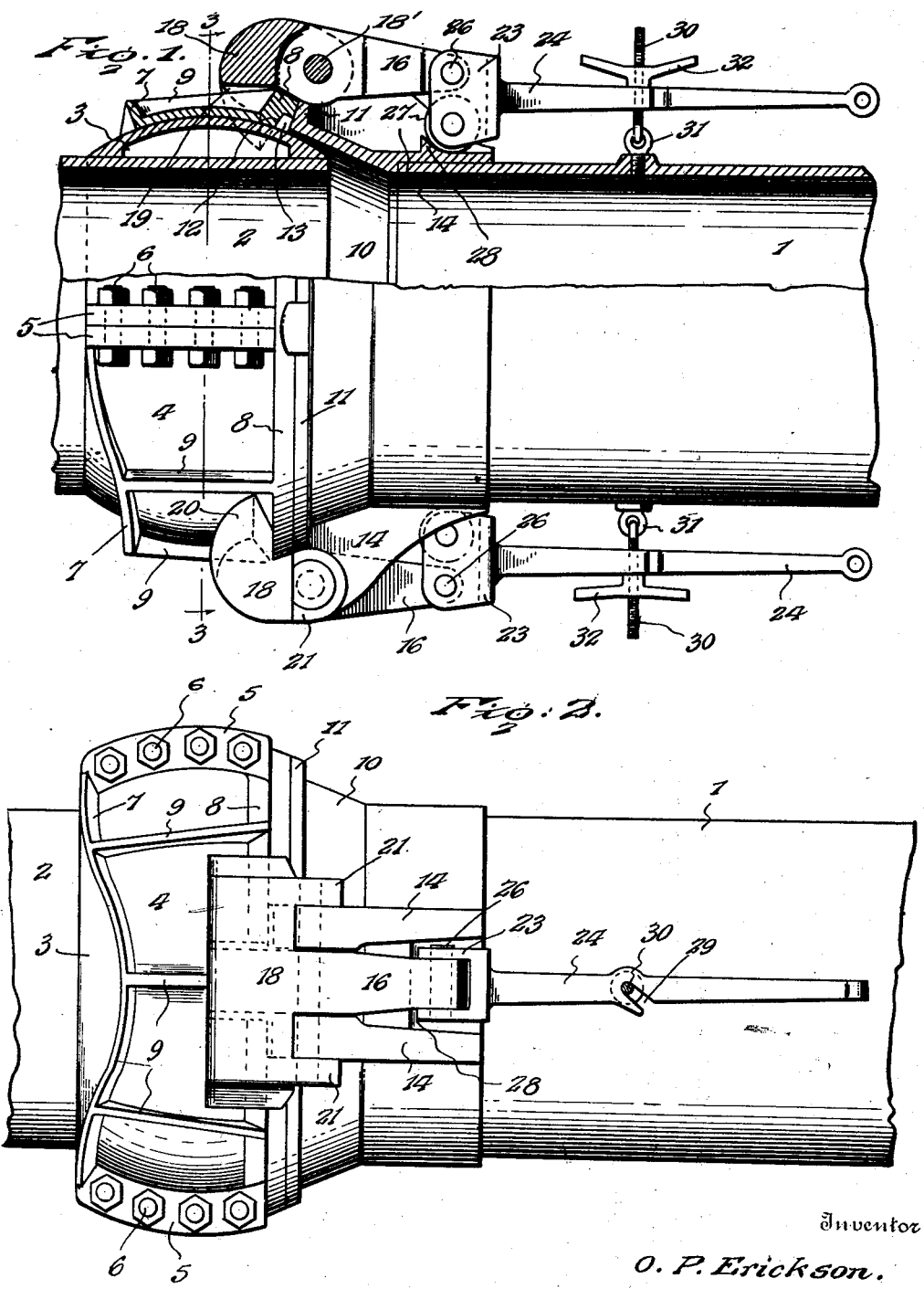

Inventor
O. P. Erickson.
By Lacey & Lacey, Attorneys

Patented Nov. 18, 1930

1,782,062

UNITED STATES PATENT OFFICE

OLE P. ERICKSON, OF CHICAGO, ILLINOIS

UNIVERSAL JOINT FOR PIPE COUPLINGS

Application filed April 5, 1928. Serial No. 267,634.

The primary object of this invention is to provide means whereby the sections of an outlet pipe for dredges may be effectually connected and may be set at any desired angle to each other. Another object of the invention is to provide a coupling which may be easily assembled with the pipe sections and which will effectually prevent leakage through the joint, and another object of the invention is to provide means whereby the members of the coupling may be easily and efficiently secured together about the meeting ends of the pipe sections. Other objects of the invention will appear incidentally in the course of the following description.

The invention is illustrated in the accompanying drawings, in which

Figure 1 is a view, partly in plan and partly in horizontal section, of the improved coupling applied to the meeting ends of pipe sections;

Fig. 2 is a side elevation of the same;

Figure 3:
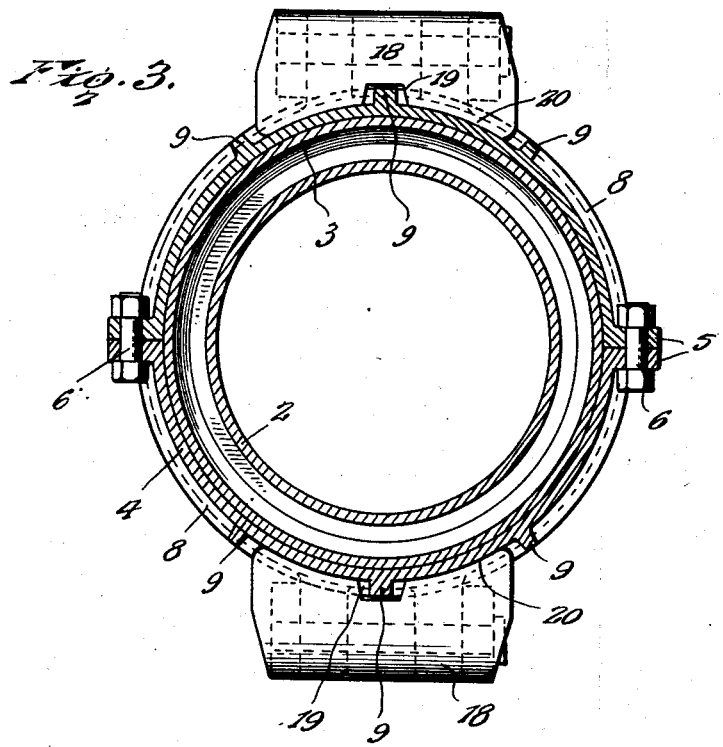
Fig. 3 is a transverse section on the line 3—3 of Fig. 1.

In the drawings, the reference numeral 1 indicates one pipe section and the numeral 2 indicates the meeting pipe section. The ball member 3 of the coupling may be formed integral with the pipe section 2 or may be formed separately therefrom and rigidly secured thereon, as by welding or other preferred process, it being noted that said ball member is a single integral element, the outer surface of which is convex longitudinally of the pipe. Fitted about the ball member is a gland 4 which is constructed in two sections adapted to meet around the pipe end and the ball member of the coupling and provided at their meeting ends with mating flanges 5 through which securing bolts 6 are inserted. The gland may thus be very easily fitted about the ball member and the dimensions of the gland should be such that initially liners or spacers may be placed between the meeting flanges and said spacers or liners removed as the parts wear through continued use to permit the sections of the gland to be tightened and maintain the proper engagement between them and the ball member 3. As shown most clearly in Fig. 2, the sections of the gland are reinforced by marginal flanges 7 and 8 and longitudinally extending ribs 9 which merge into said flanges and thereby reinforce the entire structure. It will also be noted that the flange 7 is of an ogee formation, its central portion receding from its ends so that the gland is narrower between its ends than at its ends. This formation gives a wider clearance between the edge of the gland and the side of the pipe or edge of the ball member 3 of the coupling in a horizontal direction than in a vertical direction so that sufficient extent of the mating flanges 5 is attained to permit the sections of the gland to be firmly secured together and the joint given the requisite strength while ample horizontal adjustment of the pipe sections may be effected. On floating hydraulic dredge pipe lines, it is frequently necessary to set the pipe sections in wide angular relation in a horizontal plane but seldom necessary to set them vertically out of alinement to any great degree, a range of eight degrees vertically being found sufficient for ordinary purposes while frequently a range of fifteen degrees is desired horizontally. The construction described provides for this desired horizontal adjustment while at the same time taking advantage of the lesser need for vertical variation to obtain the requisite pressure-resisting strength in the gland.

This ball joint or flexible coupling can also be used wherever any flexible connection is desired, as an oil hose connection on oil tankers, etc.

Figure 4:
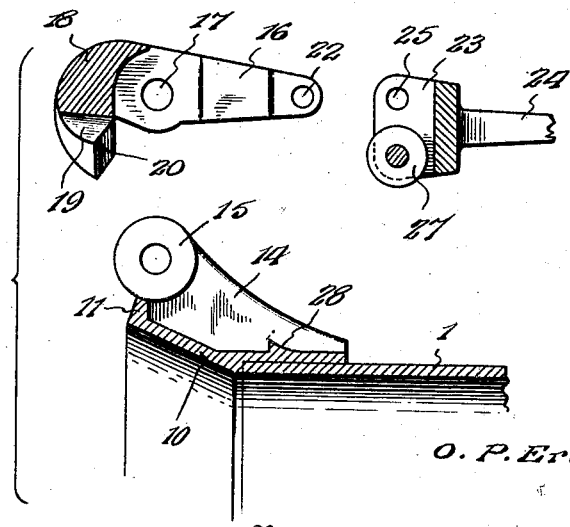
Fig. 4 is a detail view showing the socket member of the coupling, the clamping jaw and the operating lever in section and separated.

The socket member 10 of the coupling is secured around the end of the pipe 1 by welding or other preferred means so that it will be very securely attached and this member is flared, as clearly shown in Fig. 1, so that the end of the pipe 2 and the ball member 3 carried thereby may be received within the socket member. Around the outer edge of the socket member is an annular flange 11 which, as shown in Fig. 1, is adapted to abut the flange or jaw 8 of the gland and said jaw or flange 8 is recessed or overhung, as shown at 12, whereby it is adapted to receive a packing 13 of any compressible material. At diametrically opposite points, the socket member 10 is provided with lugs or ears 14 which extend to and slightly beyond the flange 11 where they are formed into bearing members 15, as shown most clearly in Fig. 4. A clamping lever 16 is disposed between the lugs or ears 14 and at a point between its ends is formed with an opening 17 to receive a fulcrum pin 18' whereby the lever will be pivotally mounted in and between the lugs, and the outer end of the lever is formed into a clamping head or jaw 18 which projects laterally beyond both sides of the lever and is notched, as shown at 19, in its under edge whereby it will fit over the central rib or flange 9 of the gland, the working side of the jaw portion 20 being curved to conform to the circular cross section of the gland, as shown most clearly in Fig. 3, and being also beveled so that it may engage flatly against the outer side of the jaw or flange 8 of the gland. Near the ends of the head 18, lugs 21 are formed thereon to receive the ends of the fulcrum pin 18', as will be understood, whereby an extended bearing for the pin is provided and bending of the pin is avoided. The end of the lever remote from the head has an opening 22 formed therethrough and fits within the fork or yoke 23 at the end of the operating or power lever 24. This fork or yoke 23 is provided with openings 25 to receive a pivot pin 26 which also passes through the opening 22 of the lever 16 whereby the jaw lever is pivotally connected to the operating lever. The yoke or fork 23 also carries a roller 27 at its inner corner, which roller is adapted to bear upon and ride on a track 28 provided therefor upon the socket member 10 between the lugs 14. It will now be understood that, if the free end of the power lever be swung toward the pipe 1, the roller 27 will serve as a fulcrum therefor shifting along the track 28 so that an outward movement will be imparted through the pivot 26 to the connected end of the clamping lever 16 and a toggle action will be created to forcibly draw the gland into close engagement with the end of the socket member, pressure being applied to the gland through the jaw element 20 of the lever 16 so that it will be moved toward the flange 11 of the socket member and the packing 13 compressed between said flange and the flange 8 of the gland so that it will be expanded against the ball member 3 and very effectually prevent leakage of liquid through the joint.

At a point between its ends, the power lever 24 is provided with an obliquely disposed open-ended slot or notch 29 and carried by the pipe 1 is an anchoring bolt 30 which is adapted to be engaged in said notch, as shown in Fig. 2. The anchoring bolt is permanently retained by an eye 31 anchored in the side of the pipe 1 so that the bolt may move freely in any direction and upon the outer end portion of the bolt is threaded a nut 32 which is adapted to be turned home against the power lever to retain the same in a set position. Power is applied to the free end of the power or operating lever 24 from any convenient source of energy so that the lever may be swung toward the pipe to exert the desired pressure through the clamping lever 16 upon the gland to positively and directly effect the desired intimate contact between the gland and the end of the socket member. After the desired sealing engagement between the gland and the socket member has been effected, the anchoring bolt may be easily swung out into engagement with the power lever to pass through the notch 29 therein, and the nut 32 is then turned home so as to prevent retrograde movement of the lever. Inasmuch as the clamping lever is attached to the socket member, the release of the gland from the socket member will be positively resisted and the desired leakproof coupling will be maintained. It will be understood that the angular adjustment of the pipe sections relative to each other is effected before the levers are operated to accomplish the desired intimate engagement between the gland and the socket member, and it will be further understood that, inasmuch as the gland has its inner surface convex from end to end so as to fit closely around the ball member of the coupling, the action of the levers will cause a relative axial movement of the gland without disturbing its relation to the ball and the pipe 2 and after the levers have been locked the coupling will maintain the form or relation in which it has been set. When it is desired to disassemble the parts to remove the pipes, for instance, to another location, all that needs to be done is to slightly loosen the nuts 32 and then swing the anchoring bolts out of engagement with the power levers. The roller which serves as the traveling fulcrum for the operating lever eliminates practically all of the frictional resistance to the tightening operation so that the clamping of the gasket to the socket member of the coupling will be very easily effected. The sectional construction of the gland is advantageous inasmuch as it facilitates the removal of the gland when necessary from the pipe and also facilitates the application of the gland to the pipe, reducing the labor necessary and providing for ready adjustment to compensate for wear.

Having thus described the invention, I claim:

1. In a pipe coupling, the combination of a socket member, a ball member engaging in the end of the socket member, a gland secured around the convex surface of the ball member and having a flange presented to the socket member, a clamping lever mounted between its ends in fixed location upon the socket member and having a jaw at one end extending over and engaging the flange of the gland, means on the socket member engaged with the opposite end of the lever for actuating said lever whereby to clamp the gland to the socket member, and means on the socket member and cooperating with said actuating means to positively lock the lever in the clamped position.

2. In a pipe coupling, the combination of a socket member, a ball member, a gland secured around the ball member and having a flange presented to the socket member, a lever fulcrumed upon the socket member and having a head engaging behind the flange on the gland, an operating lever pivotally connected to the free end of the first-mentioned lever and having a traveling fulcrum engaged with the socket member, and means whereby the power lever may be locked in operative position.

3. In a pipe coupling, the combination of a socket member, a ball member, a gland secured around the ball member and having a flange presented to the socket member, a clamping lever fulcrumed upon the socket member and having a head engaged behind the flange of the gland, a power lever provided at its working end with a fork spanning and pivoted at one corner to the free end of the first-mentioned lever, a traveling fulcrum member carried by the fork between the first-mentioned lever and the socket member, a track for said fulcrum member on the socket member, and an anchoring bolt engageable with the operating lever and equipped with a locking nut adapted to bear against the operating lever and hold the parts in coupled position.

In testimony whereof I affix my signature.

OLE P. ERICKSON. [L. S.]